July 24, 1923.
C. W. PHILIP
PISTON AND METHOD OF MANUFACTURING THE SAME
Filed Aug. 30, 1922
1,462,655
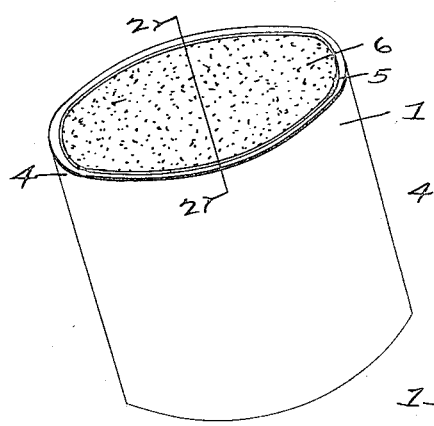
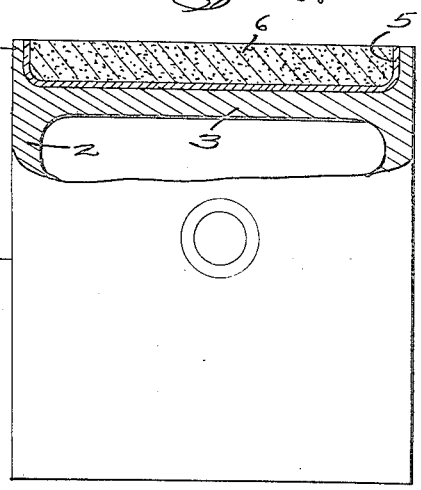
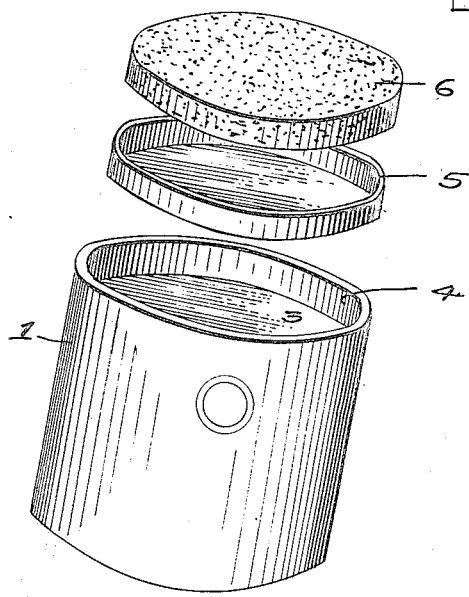
INVENTOR
CHARLES W. PHILIP
BY ATTORNEY Patented July 24, 1923. 1,462,655

UNITED STATES PATENT OFFICE.

CHARLES W. PHILIP, OF SAN FRANCISCO, CALIFORNIA.

PISTON AND METHOD OF MANUFACTURING THE SAME.

Application filed August 30, 1922. Serial No. 585,177.

*To all whom it may concern:*

Be it known that I, CHARLES W. PHILIP, a citizen of the United States, and a resident of the city and county of San Francisco, State of California, have made a new and useful invention—to wit, Improvements in Pistons and Methods of Manufacturing the Same; and I do hereby declare the following to be a full, clear, concise, and exact description of the same.

This invention relates particularly to pistons for internal combustion engines.

An object of this invention is to provide a piston having a substantially integral facing composed of material that will not absorb or conduct heat when exposed to combustion.

Another object of the invention is to provide a piston having non-conducting material on the end thereof to materially decrease the metal surface of the piston within a combustion chamber and prevent conduction of the heat therethrough, thus minimizing the destructive effects on the lubricating oils, preventing premature firing and the collection of deposits of carbon.

A still further object of the invention is to provide a piston of this character which may be fixed to operate without the use of piston rings. Other objects and advantages will appear as this description progresses.

In the specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings.

Fig. 1 represents a perspective of a piston constructed in accordance with my invention.

Fig. 2 is a vertical section through Fig. 1 on the line 2—2.

Fig. 3 is a diagrammatic section of Fig. 2.

In detail, the construction illustrated in the drawings comprises the piston 1, formed of a cylindrical body 2 having the closed end 3. The interior of the piston is constructed to receive a connecting rod or any equivalent means to effect movement of the said piston. The head or closed end of the piston is provided with an annular projecting shoulder 4, forming a cup-shaped depression, within which is adapted to be integrally incorporated a metal cup 5 with a suitable heat non-conducting material 6 thereon.

In the manufacture of pistons in accordance with the practice of my invention, it has been found necessary to follow the following process or method. A suitable heat non-conducting material, such as steatite, compressed lava or compressed asbestos or any other equivalent material having substantially a body texture capable of withstanding the destructive effects of combustion and preventing the absorption or conduction of heat, would be formed preferably as a circular disc. The disc 6, after being cut or formed in a desired manner, would be slowly baked in an oven under a heat of approximately one thousand (1,000) degrees F. for approximately one (1) hour to drive off any water or other elements that might be contained therein. The baking in the high heat also serves to harden the mass and to make it flint-like in texture. The disc 6 of the material would then be cooled and placed within the tinned, metal cap 5, so that the said disc would fit snugly within the cap. To prevent the disc 6 from moving within the cap 5, the edges of the disc 6 could be made thicker at one side than at the other, and when placed within the cap, the peripheral edge of said cap could be peaned or bent over to snugly engage the tapered edge of the disc. The cap 5 with the disc 6 therein would then be placed in a suitable piston mold and molten iron, or other metal, poured into said mold around the cap 5 and allowed to harden to form a cast or piston the shape of the mold. The cast metal, it has been found, will readily adhere to the tinned exterior of the cap 5 and form a homogeneous union therewith. After the cast metal cools and contracts, it has a tendency to shrink onto the metal cup and tightly bind said cup against the peripheral edge of the disc 6. The completed piston thus has the metal cap and non-conducting material fixedly embedded therein, so that the assembly forms a substantially integral unit.

Although the metal cap has been described more particularly with reference to being cast within the piston, whereby the shrinkage of the piston metal will tightly grip the cap in place, it is to be understood that it would be clearly within the purview of this invention to first cast a piston with a suitable cavity and then shrink the cap and non-conducting material fixedly in position in the piston.

Experiments with pistons formed with non-conducting material placed upon the head thereof when utilized in the cylinders of internal combustion engines have shown that carbon or other waste hydrocarbon particles will not collect on the non-conducting material inasmuch as it will not absorb heat so as to arise to a temperature the same as the contiguous parts. In the conventional all-metal piston, the same becomes heated to approximately the heat of combustion. The fuel gas that strikes this heated surface is broken up and disintegrated so that the fuel particles adhere to those portions of metal with which they come in contact. After an initial deposit has been made, waste hydrocarbon particles generated from combustion readily collect and form a dirty and foul combustion chamber, resulting in premature combustion and reduction in efficiency. Furthermore, with the all-metal type of piston, the heat of combustion is transferred by conduction and convection through the piston to the lubricating oils, tending to destroy the body thereof and diminish the physical properties for lubricating purposes. A piston constructed in accordance with my invention prevents the oil being heated or the lubricating properties thereof destroyed, whereby the said oil will be useful for a long period of time and, furthermore, that portion of the piston within the combustion chamber presents a relatively cool or unheatable surface which will not cause premature firing or the collection of carbon deposits.

Having thus described this invention, what I claim and desire to secure by Letters Patent is:

1. A piston having a circular cavity in the closed end thereof; a metal cup fixedly secured within said cavity and a circular disc of non-conducting material mounted within said cup.

2. A piston comprising a circular disk of heat resisting non-conducting material; a cup having said disk arranged therein with one face of said disk exposed and a piston body having said cup homogeneously united therewith to allow the exposed disk to substantially cover one end of said piston body.

3. A piston comprising a circular disk of compressed lava; a cup having said disk arranged therein with a face thereof exposed and a piston body having said cup homogeneously united therewith to allow the face of said disk to be exposed on an end of said piston body.

4. A piston having a circular cavity in its closed end, a disk of non-conducting material in the cavity, and means to connect the disk to the piston fixedly secured to the disk and homogeneously united with the piston.

5. A piston having a cavity in its closed end, a disk of non-conducting material in the cavity, and means for homogeneously uniting the disk to the piston so that the two form a substantially integral structure.

6. A piston having a cavity in its closed end, a disk of non-conducting material, a member peripherally fitted about the disk, means to secure the disk fixedly to the member and means to fixedly secure the member to the piston.

7. A piston having a cavity in its closed end, a disk of non-conducting material, and means extending about the disk periphery and fixedly engaged with the disk and homogeneously united with the piston to fixedly connect the disk to the piston.

In testimony whereof, I have hereunto set my hand at San Francisco, California, this 14th day of August, 1922.

CHARLES W. PHILIP.

In the presence of—
LINCOLN V. JOHNSON.